US012686406B2

(12) United States Patent
Zhang et al.

(10) Patent No.: US 12,686,406 B2
(45) Date of Patent: Jul. 21, 2026

(54) METHOD FOR PLANNING THE BEHAVIOR OF A VEHICLE

(71) Applicant: ZF Friedrichshafen AG, Friedrichshafen (DE)

(72) Inventors: Chi Zhang, Friedrichshafen (DE); Florian Steinhauser, Ravensburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 291 days.

(21) Appl. No.: 18/554,075

(22) PCT Filed: Apr. 11, 2022

(86) PCT No.: PCT/EP2022/059650
§ 371 (c)(1),
(2) Date: Oct. 5, 2023

(87) PCT Pub. No.: WO2022/214709
PCT Pub. Date: Oct. 13, 2022

(65) Prior Publication Data
US 2024/0124019 A1 Apr. 18, 2024

(30) Foreign Application Priority Data

Apr. 9, 2021 (DE) .......................... 102021203545.0

(51) Int. Cl.
*B60W 60/00* (2020.01)
*B60W 30/095* (2012.01)
*B60W 50/00* (2006.01)

(52) U.S. Cl.
CPC .... *B60W 60/0011* (2020.02); *B60W 30/0956* (2013.01); *B60W 50/0097* (2013.01);
(Continued)

(58) Field of Classification Search
CPC ......... B60W 60/0011; B60W 30/0956; B60W 50/0097; B60W 60/00274;
(Continued)

(56) References Cited

U.S. PATENT DOCUMENTS

| 11,970,164 B1 * | 4/2024 | Havlak | ............. | B60W 30/0956 |
| 2016/0148510 A1 * | 5/2016 | Vanholme | .............. | G08G 1/166 |
| | | | | 703/6 |

(Continued)

FOREIGN PATENT DOCUMENTS

| DE | 10 2014 016 815 A1 | 5/2016 |
| DE | 10 2019 108 142 A1 | 10/2020 |

(Continued)

OTHER PUBLICATIONS

Constatin Hubmann, Nils Quetschlich, Jens Schulz, Julian Bernhard, Daniel Althoff, Christoph Stiller, Aug. 9, 2019 (Year: 2019).*

(Continued)

*Primary Examiner* — Khoi H Tran
*Assistant Examiner* — Tristan J Greiner
(74) *Attorney, Agent, or Firm* — Crowell & Moring LLP

(57) ABSTRACT

A method for planning a behavior of a vehicle with respect to one or more occluded area(s) along a navigation path of the vehicle, wherein the method comprises an occluded area identification step, during which the occluded area(s) is/are identified, and a phantom object generation step, during which at least one phantom object is generated for at least one of the occluded areas, the occluded area(s) is/are defined based on information from a predefined occlusion scenario catalog during the occluded area identification step.

10 Claims, 5 Drawing Sheets

Figure 1:
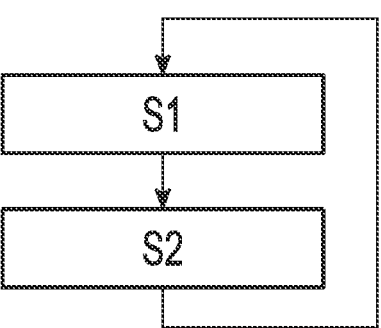

(52) U.S. Cl.
CPC ... *B60W 60/00274* (2020.02); *B60W 2552/53* (2020.02); *B60W 2554/4029* (2020.02); *B60W 2554/4045* (2020.02); *B60W 2554/80* (2020.02)

(58) Field of Classification Search
CPC ..... B60W 2552/53; B60W 2554/4029; B60W 2554/4045; B60W 2554/80; G06F 18/214; G06F 18/22; G08G 1/166; G06V 20/58; G06V 30/10
See application file for complete search history.

(56) References Cited

U.S. PATENT DOCUMENTS

2021/0061269 A1*  3/2021  Petroff ............ B60W 30/18159
2021/0064889 A1*  3/2021  Iglesias ................ G06V 10/273

FOREIGN PATENT DOCUMENTS

EP        3 091 370 A1    11/2016
WO     WO 2019/089015 A1     5/2019

OTHER PUBLICATIONS

International Search Report and Written Opinion received for Application No. PCT/EP2022/059650 mailed Jul. 14, 2022 (11 pages).
Office Action dated Nov. 12, 2021 for German Patent Application No. 10 2021 203 545.0 (18 pp.), note: pp. 1 and 2 are English language Explanations to Section C. Result of Determination Document.
Hubmann, C. et al.: "A POMDP Maneuver Planner for Occlusions in Urban Scenarios," 2019 IEEE Intelligent Vehicles Symposium (IV), 2019, S. 2172-2179.—ISSN 2642-7214 (9 pp.).

* cited by examiner

METHOD FOR PLANNING THE BEHAVIOR OF A VEHICLE

CROSS-REFERENCE TO RELATED APPLICATIONS

This application is a U.S. national stage application under 35 U.S.C. § 371 of PCT Application No. PCT/EP2022/059650, filed on Apr. 11, 2022, and published as WO 2022/214709 A1 on Oct. 13, 2022, which claims priority from German Application No. DE 10 2021 203 545.0, filed on Apr. 9, 2021, the entirety of which are each hereby fully incorporated by reference herein.

The invention relates to a method for planning a behavior of a vehicle according to the preamble of claim 1. The invention furthermore relates to a system, a vehicle, a computer program and a computer-readable medium according to the coordinate claims.

The field of autonomous driving, which typically comprises several degrees of automated driving, such as assisted driving, partly autonomous driving or yet fully autonomous driving, is a field of constant technical evolution. One reason for this is that moving a vehicle in an automated manner is typically a very complex task and is facing a high number of technical challenges.

For example, appropriate road safety has to be guaranteed when automated vehicles take part in traffic scenarios. On the other hand, a certain traffic fluidity must also be guaranteed: In order to avoid traffic jams, for example, deadlocks and other immobilizations have to be avoided.

In order to reach an appropriate trade-off between road safety on one hand and traffic fluidity on the other hand, methods for automatic behavior planning of autonomous vehicles typically calculate probabilistic values which describe probabilities for certain traffic scenarios to occur and then base their planning at least partly on such probabilities. For example, DE 10 2019 108 142 A1 describes the use of certain probabilities when choosing options for actions of an automated vehicle.

However, the known methods and systems have several shortcomings. One problem is that so far no satisfying solutions for automatically dealing with various types of occlusion scenarios in a generalized manner have been presented. An occlusion scenario is a traffic situation, during which a certain part of the surrounding of a vehicle is not visible due to the fact that this part of the surrounding is occluded by an object. In other words, in an occlusion scenario, the field of view of a vehicle, for which automated behavior is planned, is occluded by an object. Such objects can for example be other vehicles, such as cars, buses or trucks or yet permanent infrastructure components such as bridges, walls, buildings or the like. Furthermore, satisfying probabilistic descriptions of situations that can occur in occlusion scenarios are still missing.

It is the problem of the invention to overcome or to at least diminish the above-mentioned disadvantages.

The problem is solved by a method for planning a behavior of a vehicle with respect to one or more occluded area(s) along a navigation path of the vehicle, wherein the method comprises an occluded area identification step during which the occluded area(s) is/are identified, and a phantom object generation step during which at least one phantom object is generated for at least one of the occluded areas, wherein during the occluded area identification step, the occluded area(s) is/are defined based on information from a predefined occlusion scenario catalog.

The method is typically a computer-implemented method. The vehicle is typically an autonomous vehicle, meaning that the vehicle is configured for at least one type of autonomous driving, such as assisted driving, partly autonomous driving or yet fully autonomous driving. The expression "behavior" describes a reaction of the vehicle to an occluded area, for example a slowing down when approaching and/or passing an object that is responsible for the occluded area or creeping forward step by step when passing an object that creates the occluded area. In typical embodiments, several occluded areas are identified along the navigation path. A "navigation path" is typically a route which the vehicle can be expected to take. "Identifying" an occluded area typically means that it is being detected that an occluded area will at least probably occur in the navigation path. In general, the identification can take place by means of the analysis of map data or by means of an analysis of sensor data, in particular sensor data of the vehicle, or a combination of both.

A "phantom object" is a virtual object located inside an occluded area. Examples for phantom objects are other vehicles or yet pedestrians.

The expression "defined based on information from a predefined occlusion scenario catalog" can for example comprise matching the identified occluded area with a predefined occluded area type present in the occlusion scenario catalog and/or setting certain variables and/or constants corresponding to the chosen occluded area type to certain values.

By means of such a method for planning a behavior of a vehicle, the handling of occlusion scenarios in the behavior planning of autonomous vehicles is therefore generalised, which makes it possible to handle occluded areas along a navigation path of the vehicle in a straight-forward and reliable manner.

In certain embodiments, the occlusion scenario catalog comprises different occlusion scenarios and scenario information for each occlusion scenario. For example, the occlusion scenario catalog can comprise different occluded area types as occlusion scenarios and/or information relating to each of these occluded area types, such as variables or constants that describe the different occluded area types. In typical embodiments, the occlusion area catalog comprises one or more of the following occluded area types: a bus stop, a zebra crossing, a school, a taxi stop, a lane or an intersection. In typical embodiments, the occlusion scenario catalog comprises all possible occlusion scenarios that need to be handled by the vehicle. In typical embodiments, the occlusion scenario catalog is defined, typically offline, and comprises definitions of several risky occluded areas. The occlusion scenario catalog is then used to, typically online, carry out the occluded area identification step, for example by accessing map data and/or sensor data and/or navigation data of the vehicle and by defining the occluded area(s) based on this data and information present in the occlusion scenario catalog.

In typical embodiments, the phantom object generation step comprises the calculation of an appearance probability for the phantom object, wherein the appearance probability describes the probability for the phantom object to emerge from its occluded area into a field of view of the vehicle. The expression "its occluded area" is typically understood such that it relates to the particular occluded area into which the phantom object has been virtually placed. Calculating such an appearance probability has the advantage of making it possible to find an appropriate trade-off between road safety on one hand and traffic fluidity on the other hand when operating the vehicle.

In typical embodiments, the appearance probability comprises a static component, wherein the static component preferably takes into account a map and/or road topology information, and/or wherein the static component preferably depends on an initial environmental probability and/or on a phantom object distance and/or on a distance threshold. The initial environmental probability is typically a value between 0 and 1 and is typically defined in the occlusion scenario catalog for each of the occluded area types. The initial environmental probability is an example for the before-mentioned scenario information. The "phantom object distance" typically describes a distance between a beginning of a high risk area located inside an occluded area and the phantom object. A high risk area is typically the area of particular interest in an occluded area of a certain type. For example, the high risk area within an occluded area of the type "zebra crossing" is typically the zebra crossing itself, wherein the occluded area of the type "zebra crossing" can also comprise areas in a vicinity of the zebra crossing which are, however, not part of the zebra crossing as such. Similar definitions apply to other high risk areas such as bus stops, taxi stands, intersections or the like. The "distance threshold" is a particular value of the phantom object distance after which the static component has the value of 0. The distance threshold is preferably located outside the high risk area but inside the occluded area. In typical embodiments, the static component has the value of the initial environmental probability over the entire high risk area. In preferred embodiments, the static component drops, preferably linearly, from an end of the high risk area to the distance threshold where it takes the value of 0.

In preferred embodiments, the appearance probability comprises a dynamic component, wherein the dynamic component preferably at least indirectly takes into account a geometric modification of the occluded area between two moments in time, and/or wherein the dynamic component preferably depends on a one-phantom-object-length, wherein the one-phantom-object-length is defined as a length inside an occluded area in which exactly one phantom object is expected, wherein the one-phantom-object-length is preferably measured in a direction which is perpendicular to a longitudinal axis of the vehicle, and/or wherein the dynamic component preferably depends on a field of view increase, wherein the field of view increase is preferably a length measured in a direction which is perpendicular to a longitudinal axis of the vehicle, wherein the one-phantom-object-length and the field of view increase are typically directed in a parallel manner. The inventors have found that such a dynamic component is a particularly advantageous possibility to obtain a good trade-off between road safety and traffic fluidity.

In typical embodiments, the static component is calculated according to the equation $$P_{env}(d) = \max\left(\left(K_{env}\frac{D_S - d}{D_S}\right), 0\right)$$

wherein $P_{env}(d)$ is the static component, $K_{env}$ is the initial environmental probability, $D_S$ is the distance threshold and d is the phantom object distance, and/or the dynamic component is preferably calculated according to the equation $$P_{FoV}(u) = \begin{cases} 0, & \text{for } u \le 0 \\ \dfrac{u}{L}, & \text{for } u > 0 \wedge u < L \\ 1, & \text{for } u \ge L \end{cases}$$

wherein $P_{FoV}(u)$ is the dynamic component, u is the field of view increase and L is the one-phantom-object-length, and/or the appearance probability is preferably calculated according to the equation $$P_a(d,u) = \min((P_{env}(d) + P_{FoV}(u)), 1).$$

The problem is furthermore solved by a system for planning a behavior of a vehicle with respect to one or more occluded area(s) along a navigation path of the vehicle, wherein the system is configured to identify the occluded area(s) and to generate at least one phantom object for at least one of the occluded areas, wherein the system is configured to define the occluded area(s) based on information from a predefined occlusion scenario catalog.

The system is preferably configured to carry out a method according to any of the previously described embodiments. In typical embodiments, the system comprises an occluded area identification module and/or a phantom object generation module and/or an appearance probability calculation module configured to calculate the above-mentioned appearance probability, typically including the static component and/or the dynamic component. In typical embodiments, at least one of these modules, preferably all of these modules, is/are implemented by means of software code. The system typically comprises means for carrying out at least one method according to any of the above-mentioned embodiments, in particular computer hardware means such as processing units, memory devices or the like for participating in the different methods and/or steps outlined above.

The problem is furthermore solved by a vehicle, wherein the vehicle comprises a system according to any of the above-mentioned embodiments and/or wherein the vehicle is configured to carry out any of the above-mentioned methods.

A computer program comprises, in a typical embodiment of the invention, instructions which, when the program is executed by a computer, cause the computer to carry out a method according to any of the above-mentioned embodiments. The expression "computer" is to be understood as referring to any device or structure that is able to execute the instructions. The computer program can also be referred to as computer program product.

A computer-readable medium comprises, in an embodiment of the invention, computer program code for carrying out a method according to any of the above-mentioned embodiments and/or comprises a computer program according to the above-mentioned embodiment. The expression "computer-readable medium" can be understood as referring in particular but not exclusively to hard disks and/or servers and/or memory sticks and/or flash drives and/or DVDs and/or Blu-ray disks and/or CDs. Furthermore, the expression "computer-readable medium" can also refer to a data stream which is for example established when a computer program and/or a computer program product is downloaded from the internet.

Figure 2:
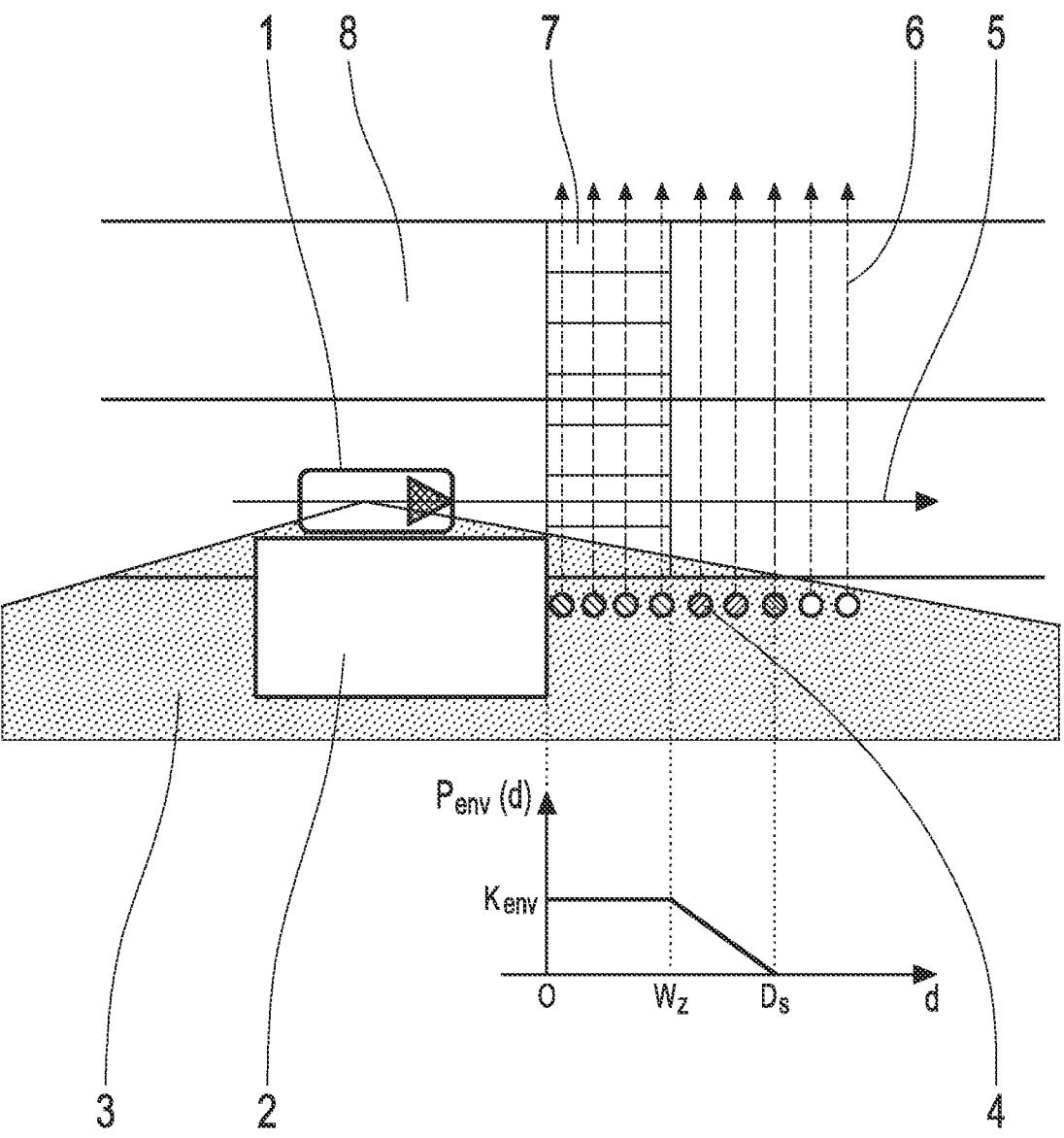
Figure 3:
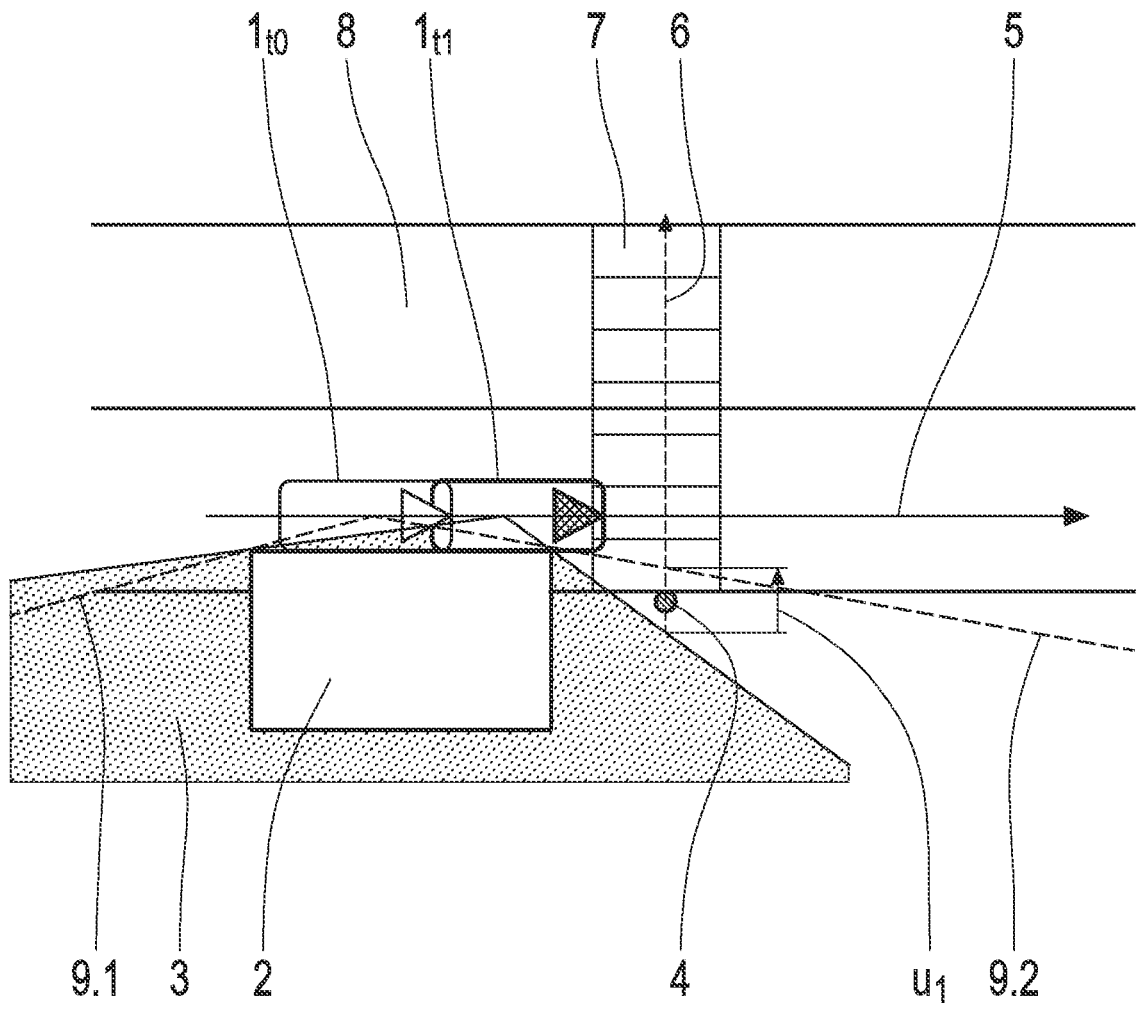
Figure 4:
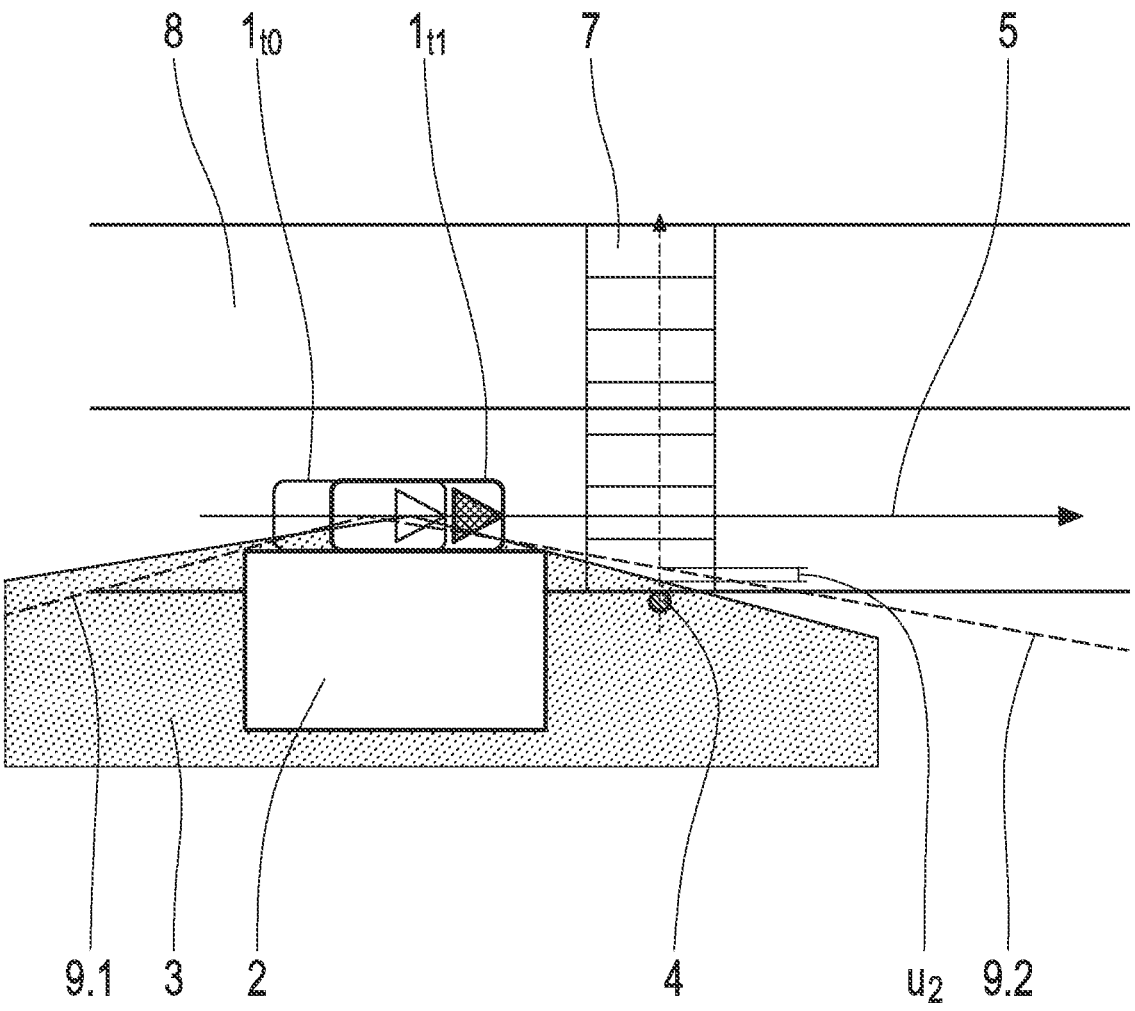
Figure 5:
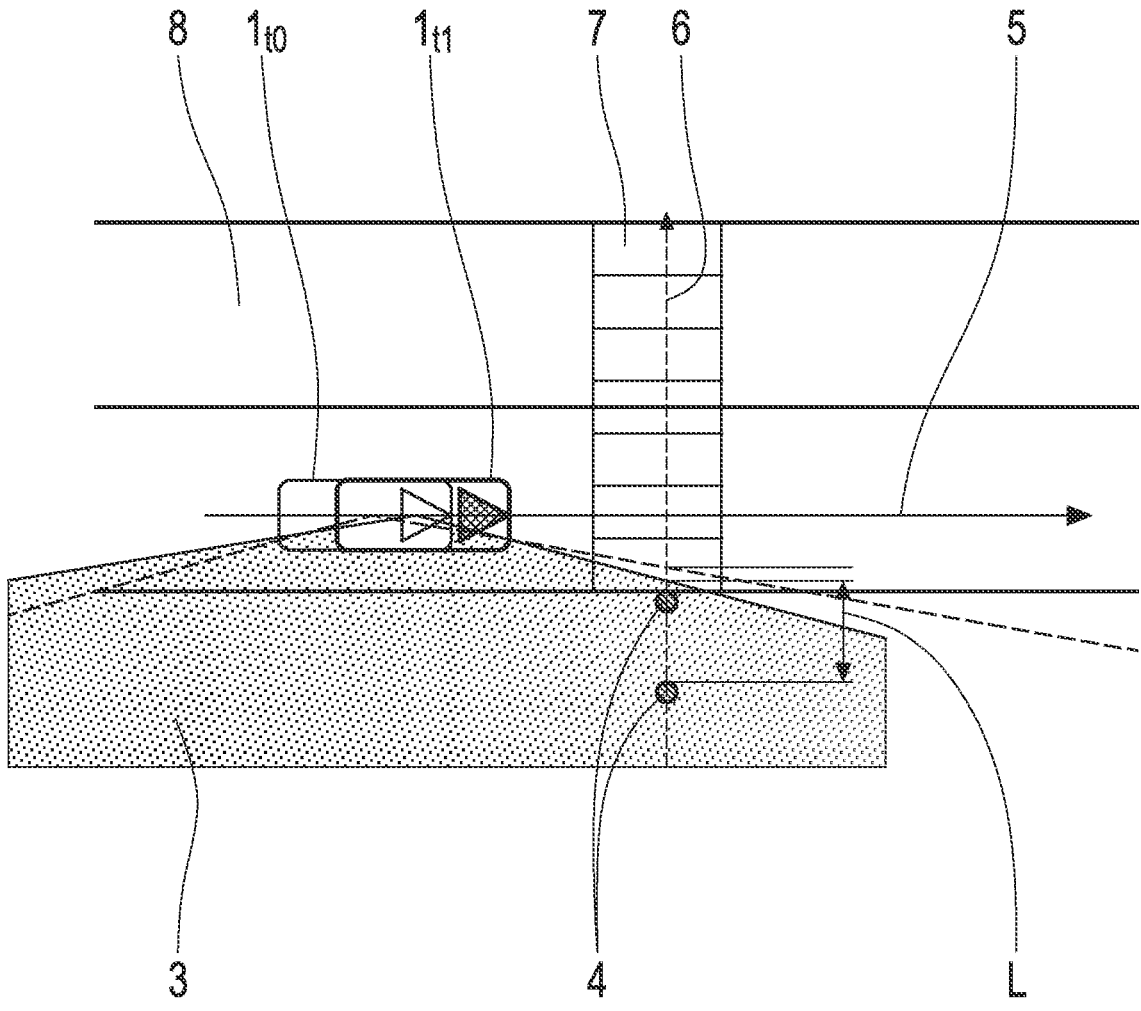

In the following, the invention is explained by means of Figures, wherein show:

FIG. 1 shows a flow diagram of one embodiment of a method according to the invention, FIG. 2 a schematic drawing explaining the static component of the appearance probability, FIG. 3 a first schematic drawing explaining the dynamic component of the appearance probability, FIG. 4 a second schematic drawing explaining the dynamic component of the appearance probability, and FIG. 5 a schematic drawing visualizing the one-phantom-object-length L.

FIG. 1 shows a flow diagram of one embodiment of a method according to the invention. The method comprises an occluded area identification step S1 and a phantom object generation step S2. During operation of an autonomous vehicle (not shown in FIG. 1), the steps S1, S2 are being carried out continuously, typically by means of an infinite loop. In certain embodiments, however, it is not necessary for the method to be carried out in an infinite loop. For example, it is also possible that the method with the steps S1 and S2 is only carried out on demand at certain moments in time. During the occluded area identification step S1, occluded areas along a navigation path of the autonomous vehicle are identified, in particular by means of analyzing map data and by analyzing sensor data supplied by sensors present in the autonomous vehicle. Furthermore, this map data and sensor data is matched with content from an occlusion scenario catalog, such that the detected occluded areas along the navigation path of the vehicle are being matched to generalized occluded area types which are present in the occlusion scenario catalog. The occluded area identification step S1 also comprises setting typical variables and constants for the different identified occluded areas based on information present in the occlusion scenario catalog.

In the phantom object generation step S2, phantom objects are generated for at least one of the identified occluded areas, typically for all of the occluded areas. The generation of the phantom objects is typically at least partly based on information taken from the occlusion scenario catalog and/or on the map data and/or on the sensor data. In typical embodiments, the phantom object generation step S2 comprises the calculation of the appearance probability/probabilities for the phantom object(s).

FIG. 2 shows a schematic drawing explaining the static component of the appearance probability. In particular, FIG. 2 shows a vehicle 1 on a road 8. A zebra crossing 7 crosses road 8. The vehicle 1 is next to an obstacle 2 which is also referred to as occluding object. Because of the obstacle 2, the vehicle 1 is not able to detect its entire surrounding: In particular, the obstacle 2 creates an occluded area 3 which cannot be "seen" by the vehicle 1. FIG. 2 furthermore shows nine pedestrians 4 out of which only one is equipped with a reference sign for the purpose of simplicity. Each pedestrian 4 has a hypothetic walking path 6 which crosses the road 8 in a direction which is perpendicular to a longitudinal axis 5 of the vehicle 1. FIG. 1 also shows a representation of the static component Penv(d) for the traffic situation depicted in FIG. 2. The zebra crossing 7 has a width Wz. Over this entire width Wz, the static component Penv(d) takes a constant value of Kenv, namely the initial environmental probability. This initial environmental probability Kenv is for example determined based on information from the occlusion scenario catalog and/or on the map data. The graph at the bottom of FIG. 2 shows the static component Penv(d) of the appearance probability as a function of the phantom object distance d. It can be seen that d is measured from the start of the zebra crossing 7 (the zebra crossing 7 itself is a high risk area). "Start" means that edge of the zebra crossing 7 that is closest to the vehicle 1. FIG. 2 also shows a distance threshold DS which is located outside the actual high risk area/zebra crossing 7. Between the zebra crossing 7 and the distance threshold DS, the static component Penv(d) of the appearance probability linearly decreases from the initial environmental probability Kenv down to 0. At points which are further away from the zebra crossing 7 than the distance threshold DS, the static component Penv(d) of the appearance probability equals 0.

FIG. 3 shows a first schematic drawing explaining the dynamic component of the appearance probability. In particular, FIG. 3 shows a vehicle 1, but at two different moments in time. The vehicle 1$t$1 is the vehicle at the current moment in time t1 and the vehicle 1$t$0 is the vehicle at one time step before, namely at the time step t0. Just as in FIG. 2, the vehicle 1$t$0, the vehicle 1$t$1 is on a road 8 which is crossed by a zebra crossing 7. The vehicle 1$t$0, 1$t$1 has a longitudinal axis 5. The vehicle 1$t$0, 1$t$1 is driving by the obstacle 2. At the time t1 the obstacle 2 creates an occluded area 3 for the vehicle 1$t$1. FIG. 3 also shows two edges of a previous occluded area 9.1, 9.2, namely the occluded area as it was for the vehicle 1$t$0. FIG. 3 also shows a pedestrian 4 and a field of view increase u1. The field of view increase u1 is a distance (typically measured in meters) which is measured in the direction perpendicular to the longitudinal axis 5 of the vehicle 1$t$1. In the example shown in FIG. 3, the field of view increase u1 is also measured in the direction of the hypothetic walking path 6 of the pedestrian 4. The field of view increase u1 corresponds to the increase of the field of view at the height of the pedestrian 4. In other words: The dynamic component of the appearance probability for the pedestrian 4 (which is a phantom object) after the time step between the moments in time t0 and t1 is calculated with a field of view increase u1 as shown in FIG. 3. One can also say that u1 is the length of the hypothetic walking path 6 of the pedestrian 4 that is being uncovered from the occluded area 3 between the time points t0 and t1. In the case of FIG. 3, u1 is large enough for the pedestrian 4 to actually move out of the occluded area 3. In other words, the dynamic component corresponding to the situation shown in FIG. 3 takes the value 1.

FIG. 4 shows a situation similar to the situation shown in FIG. 3. However, in FIG. 4 the vehicle 1$t$0, 1$t$1 has moved a shorter distance along the obstacle 2 than in FIG. 3. Therefore, the field of view increase u2 is smaller than the field of view increase u1 shown In FIG. 3. In particular, the field of view increase u2 shown in FIG. 4 is such that the appearance probability of the pedestrian 4 is still so small that the pedestrian 4 remains in the occluded area 3.

FIG. 5 shows a schematic drawing visualizing the one-phantom-object-length L. In particular, FIG. 5 shows how the one-phantom-object-length L is determined at a certain location in the horizontal direction of FIG. 5. The one-phantom-object-length L is the length measured in the direction of the hypothetic walking path 6 of the pedestrian 4 which contains exactly one pedestrian 4.

The invention is not limited to the preferred embodiments described here. The scope of protection is defined by the claims.

It is further to be noted that methods disclosed in the specification or in the claims may be implemented by a device having means for performing each of the respective acts of these methods.

LIST OF REFERENCE SIGNS

1, 1$_{t0}$, 1$_{t1}$ vehicle
2 obstacle (also referred to as occluding object)
3 occluded area
4 pedestrian 5 longitudinal axis (of vehicle)
6 hypothetic walking path
7 zebra crossing
8 road
9.1, 9.2 edges of previous occluded area
S1 occluded area identification step
S2 phantom object generation step
$u_1$, $u_2$ field of view increase
$P_{env}(d)$ static component (of appearance probability)
$K_{env}$ initial environmental probability
$D_s$ distance threshold
d phantom object distance
$W_z$ zebra crossing width
L one-phantom-object-length

The invention claimed is:

1. A computer-implemented method for planning a behavior of a vehicle with respect to one or more occluded areas along a navigation path of the vehicle, the method comprising:

Identifying, with a processor, one or more occluded areas; and generating, with the processor, at least one phantom object for at least one of the one or more occluded areas; and automatically operating, with the processor, the vehicle along a navigation path based in part on the at least one phantom object for the at least one of the one or more occluded areas along the navigation path;

wherein the one or more occluded areas are defined based on information from a predefined occlusion scenario catalog;

wherein generating the at least one phantom object comprises calculating, with the processor, an appearance probability for the at least one phantom object, wherein the appearance probability describes a probability for the phantom object to emerge from its occluded area into a field of view of the vehicle; and wherein the appearance probability comprises a dynamic component, wherein the dynamic component at least indirectly takes into account a geometric modification of the occluded area between two moments in time, and wherein the dynamic component depends on a one-phantom-object-length, wherein the one-phantom-object-length is defined as a length inside an occluded area in which exactly one phantom object is expected, wherein the one-phantom-object-length is preferably measured in a direction which is perpendicular to a longitudinal axis of the vehicle, and wherein the dynamic component depends on a field of view increase, wherein the field of view increase is a length measured in a direction which is perpendicular to a longitudinal axis of the vehicle, wherein the one-phantom-object-length and the field of view increase are typically directed in a parallel manner.

2. The method according to claim 1, wherein the occlusion scenario catalog comprises different occlusion scenarios and scenario information for each occlusion scenario.

3. The method according to claim 1, wherein the appearance probability comprises a static component, wherein the static component takes into account a map and/or road topology information, and/or wherein the static component depends on an initial environmental probability and/or on a phantom object distance and/or on a distance threshold.

4. The method according to claim 1, wherein:

a static component is calculated according to the equation $$P_{env}(d) = \max\left(\left(K_{env}\frac{D_S - d}{D_S}\right), 0\right)$$

and/or
the dynamic component is calculated according to the equation $$P_{FoV}(u) = \begin{cases} 0, & \text{for } u \leq 0 \\ \dfrac{u}{L}, & \text{for } u > 0 \wedge u < L \\ 1, & \text{for } u \geq L \end{cases}$$

and/or
the appearance probability is preferably calculated according to the equation $$P_a(d,u) = \min((P_{env}(d) + P_{FoV}(u)), 1).$$

5. A system for planning a behavior of a vehicle with respect to one or more occluded areas along a navigation path of the vehicle, comprising:

at least one processing device configured to:

identify the one or more occluded areas;

generate at least one phantom object for at least one of the one or more occluded areas;

define the one or more occluded areas based on information from a predefined occlusion scenario catalog; and automatically operate the vehicle along a navigation path based in part on the at least one phantom object for the at least one of the one or more occluded areas along the navigation path;

wherein to generate the at least one phantom object, the at least one processing device is configured to:

calculate an appearance probability for the at least one phantom object, wherein the appearance probability describes a probability for the phantom object to emerge from its occluded area into a field of view of the vehicle;

wherein the appearance probability comprises a dynamic component, wherein the dynamic component at least indirectly takes into account a geometric modification of the occluded area between two moments in time, and wherein the dynamic component depends on a one-phantom-object-length, wherein the one-phantom-object-length is defined as a length inside an occluded area in which exactly one phantom object is expected, wherein the one-phantom-object-length is preferably measured in a direction which is perpendicular to a longitudinal axis of the vehicle, and wherein the dynamic component depends on a field of view increase, wherein the field of view increase is a length measured in a direction which is perpendicular to a longitudinal axis of the vehicle, wherein the one-phantom-object-length and the field of view increase are typically directed in a parallel manner.

6. A vehicle comprising:

the system according to claim 5.

7. A non-transitory computer-readable medium having stored thereon computer program code that, when executed by a processing device, cause the processing device to execute a method comprising:

identifying one or more occluded areas;

generating at least one phantom object for at least one of the one or more occluded areas; and automatically operating the vehicle along a navigation path based in part on the at least one phantom object for the at least one of the one or more occluded areas along the navigation path;

wherein the one or more occluded areas are defined based on information from a predefined occlusion scenario catalog;

wherein generating the at least one phantom object comprises calculating an appearance probability for the at least one phantom object, wherein the appearance probability describes a probability for the phantom object to emerge from its occluded area into a field of view of the vehicle; and wherein the appearance probability comprises a dynamic component, wherein the dynamic component at least indirectly takes into account a geometric modification of the occluded area between two moments in time, and wherein the dynamic component depends on a one-phantom-object-length, wherein the one-phantom-object-length is defined as a length inside an occluded area in which exactly one phantom object is expected, wherein the one-phantom-object-length is preferably measured in a direction which is perpendicular to a longitudinal axis of the vehicle, and wherein the dynamic component depends on a field of view increase, wherein the field of view increase is a length measured in a direction which is perpendicular to a longitudinal axis of the vehicle, wherein the one-phantom-object-length and the field of view increase are typically directed in a parallel manner.

8. The system according to claim 5, wherein the occlusion scenario catalog comprises different occlusion scenarios and scenario information for each occlusion scenario.

9. The system according to claim 5, wherein the appearance probability comprises a static component, wherein the static component takes into account a map and/or road topology information, and/or wherein the static component depends on an initial environmental probability and/or on a phantom object distance and/or on a distance threshold.

10. The system according to claim 5, wherein the at least one processing device is configured to:

calculate a static component according to the equation $$P_{env}(d) = \max\left(\left(K_{env}\frac{D_S - d}{D_S}\right), 0\right)$$

and/or
calculate the dynamic component according to the equation $$P_{FoV}(u) = \begin{cases} 0, & \text{for } u \le 0 \\ \dfrac{u}{L}, & \text{for } u > 0 \land u < L \\ 1, & \text{for } u \ge L \end{cases}$$

and/or
calculate the appearance probability according to the equation $$P_a(d,u) = \min((P_{env}(d) + P_{FoV}(u)), 1).$$

* * * * *